United States Patent [19]
Mearns

[11] Patent Number: 5,969,860
[45] Date of Patent: Oct. 19, 1999

[54] OPTICAL SYSTEM

[75] Inventor: Ian Duguid Mearns, St Asaph, United Kingdom

[73] Assignee: Pilkington PE Limited, St Asaph, United Kingdom

[21] Appl. No.: 09/078,456

[22] Filed: May 13, 1998

[30] Foreign Application Priority Data

Jun. 2, 1997 [GB] United Kingdom .................. 9711363

[51] Int. Cl.[6] .......................... G03B 13/06; G02B 17/00
[52] U.S. Cl. .......................... 359/432; 359/353; 359/365; 359/421
[58] Field of Search .................................. 359/362–366, 359/350–351, 353–357, 359–361, 422, 432, 726–732, 850, 871, 856–861, 879, 900, 399–409, 421

[56] References Cited

U.S. PATENT DOCUMENTS 4,877,317  10/1989  Gibbons et al. ..................... 359/421
5,113,281  5/1992  Mandelboum et al. ............... 359/365
5,161,051  11/1992  Whitney et al. ...................... 359/353
5,734,496  3/1998  Beach .................................... 359/731

FOREIGN PATENT DOCUMENTS 4-20914   1/1992  Japan .................................... 359/399
1327042   7/1987  Russian Federation ............... 359/399

Primary Examiner—Thong Nguyen
Attorney, Agent, or Firm—Alston&Bird LLP

[57] ABSTRACT

A dual field optical system [20] comprises an objective [A, B,] which forms an intermediate image [10] and a relay [E, F,] which transfers radiation to a focal plane [12]. The objective [A, B] comprises a primary mirror [A] and a secondary mirror [B] arranged in the form of a Cassegrain system and is rendered dual-field by the provision of an alternative primary mirror [A$^1$] which is axially movable between in-use and out-of-use positions. The primary mirror [A] forms part of a housing [J] for a linear actuator [15] which is connected by co-axial rods [14] to the alternative primary mirror [A$^1$] so that the system is both compact and of low mass due to symmetry.

4 Claims, 2 Drawing Sheets

OPTICAL SYSTEM

FIELD OF THE INVENTION

This invention relates to optical systems.

BACKGROUND OF THE INVENTION

In a number of optical systems it is desirable to have low mass optics that occupy a short length in comparison with focal length. It is also desirable to have more than one field of view in that a large image scale and therefore long focal length is required for an object at long range whereas a wider field of view may be desirable for an object at closer range.

SUMMARY OF THE INVENTION

According to the present invention there is provided an optical system comprising an objective which forms an intermediate image and a relay which transfers radiation from the intermediate image to a focal plane, wherein the objective comprises a principal concave primary mirror and a secondary mirror arranged generally in the form of a Cassegrain system and the optical system is rendered dual field by the provision of an alternative primary mirror which is axially movable between an out-of-use position adjacent the secondary mirror and an in-use position adjacent the intermediate image, where the principal concave primary mirror forms part of a housing for a linear actuator which is connected by co-axial rods to the alternative primary mirror.

The linear actuator may be electromagnetically operated or it may be pneumatically operated. Conveniently the linear actuator comprises an annular chamber housing an axially movable ring.

The secondary mirror of the objective may be concave or near planar with either slight concave or slight convex curvature, and the term 'Cassegrain' as used herein is intended to embrace such alternative possibilities.

The relay may be wholly reflective or it may incorporate a Mangin mirror or it may be wholly refractive or partly refractive and partly diffractive.

By virtue of the present invention a dual field optical system is provided incorporating a field changer whilst retaining compactness and low mass due to symmetry.

BRIEF DESCRIPTION OF THE DRAWINGS

An embodiment of the present invention will now be described by way of example with reference to the accompanying drawings, in which.

DETAILED DESCRIPTION OF THE DRAWINGS

Figure 1:
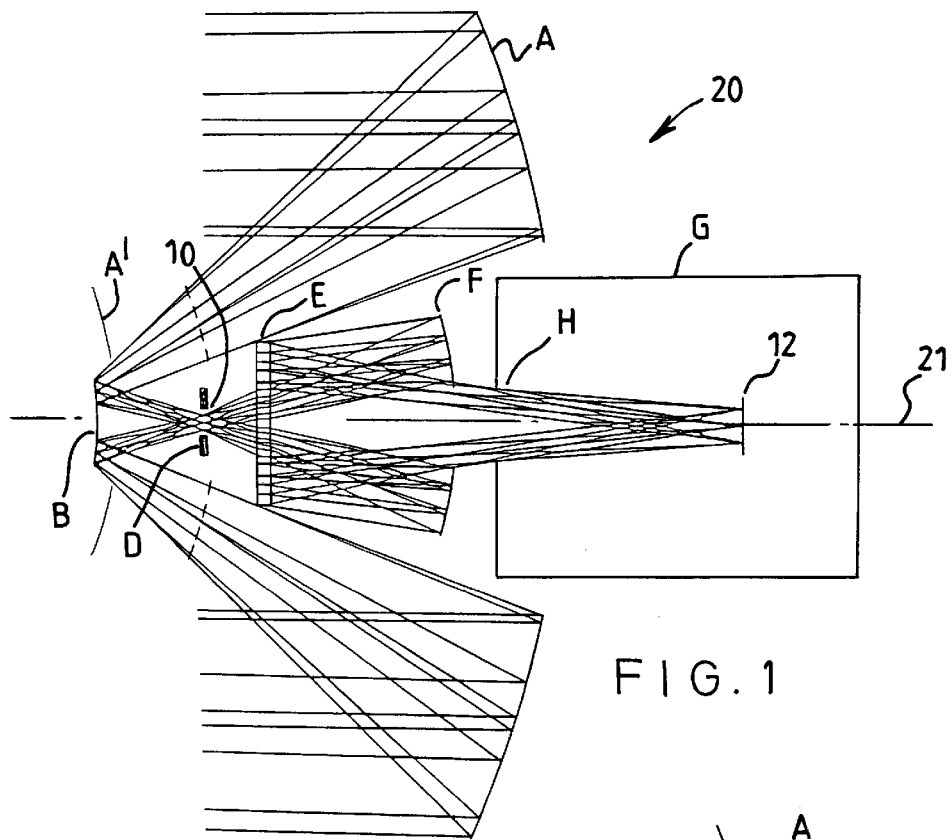
FIG. 1 illustrates one field of view of a dual field optical system.
Figure 2:
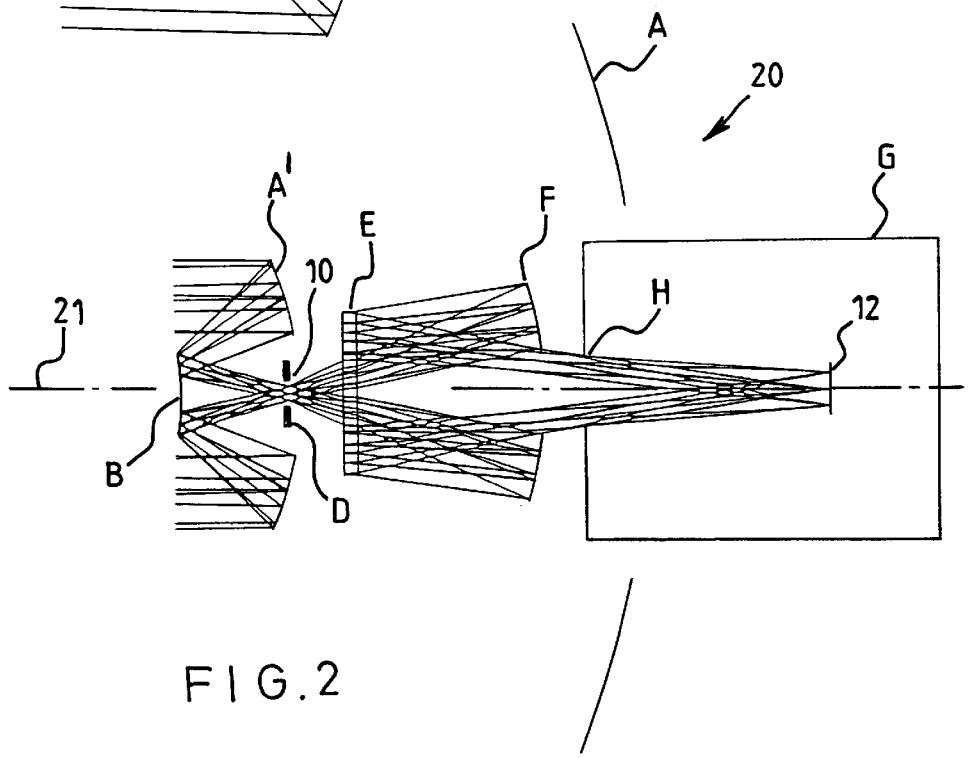
FIG. 2 illustrates the other field of view of the FIG. 1 system.
Figure 3:
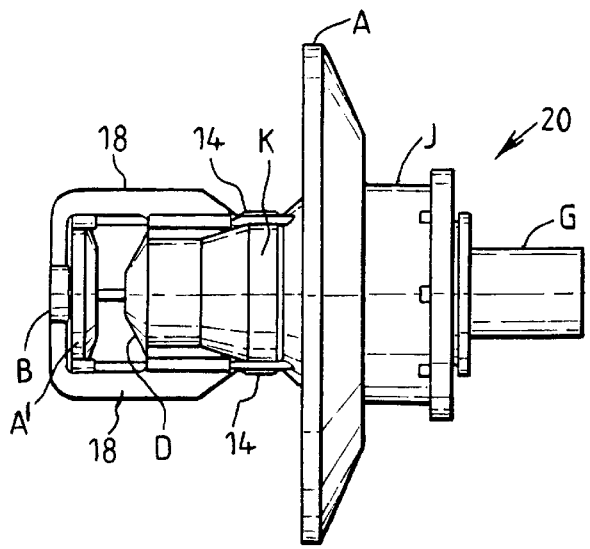
FIG. 3 is a side view of the FIG. 1 system showing the system housing.

The optical system 20 which is shown in FIGS. 1 and 2 comprises an objective formed by a principal concave primary mirror A, a secondary mirror B and an alternative primary mirror $A^1$ which is axially movable from the out-of-use position shown in FIG. 1 to the in use position shown in FIG. 2. The objective is arranged generally in the form of a Cassegrain system and forms an intermediate image 10 where a field stop D is located. A relay, which in this embodiment is formed by face-to-face mirrors E,F, transfers radiation from the intermediate image 10 to a focal plane 12. The focal plane 12 is formed on the surface of a detector system which is housed as shown schematically at G and which provides an aperture stop at H. As illustrated mirror E is a Mangin mirror (ie a reflective surface formed on a refractive substrate) to provide correction for unwanted chromatic aberration which may be present in the event that the system 20 is located behind a curved, and therefore powered, window.

It will of course be understood that mirrors A, $A^1$, E and F are apertured on-axis to enable transfer of radiation to the final image at focal plane 12.

In the case where the system 20 is designed to handle infrared waveband radiation housing G accommodates the Dewar of the detector system.

Figure 4:
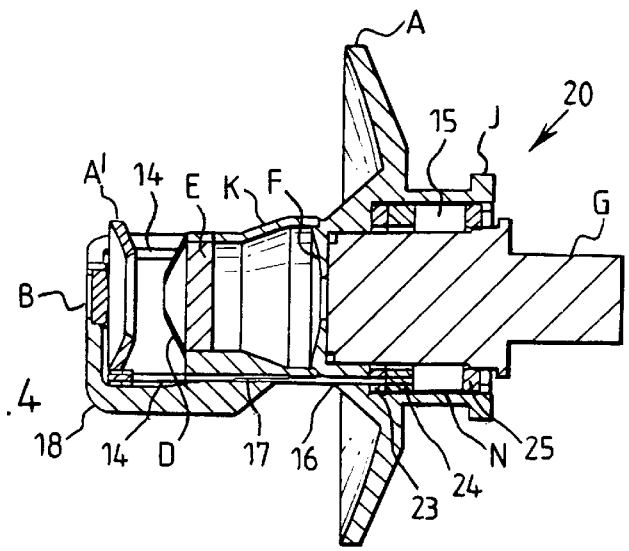
FIG. 4 is a sectional side view of FIG. 3.

The system 20 has a linear optical axis 21 and all of the components described are centered on the axis and mirror $A^1$ is movable along the axis 21. This is achieved as best shown in FIG. 4 by mounting the mirror $A^1$ on three equi-spaced rods 14 (two of which are shown in FIG. 4) which extend co-axially with the optical axis 21 to connect with a linear actuator 15 located in an annular chamber formed between the outside of housing G and the inside of a tubular housing extension J which is integral with the rear of mirror A. Rods 14 pass through passageways 16 in mirror A at a location which does not interfere with the optical performance of mirror A. Furthermore, mirror F is formed integrally with the mirror A and provides a collar for locating a canister K which carries both the mirror E and the field stop D. Three equi-spaced webs 18 extend coaxially from the outer surface of the canister K to support the secondary mirror B and the rods 14 are slidably received in passageways 17 extending through the webs 18.

Figure 5:
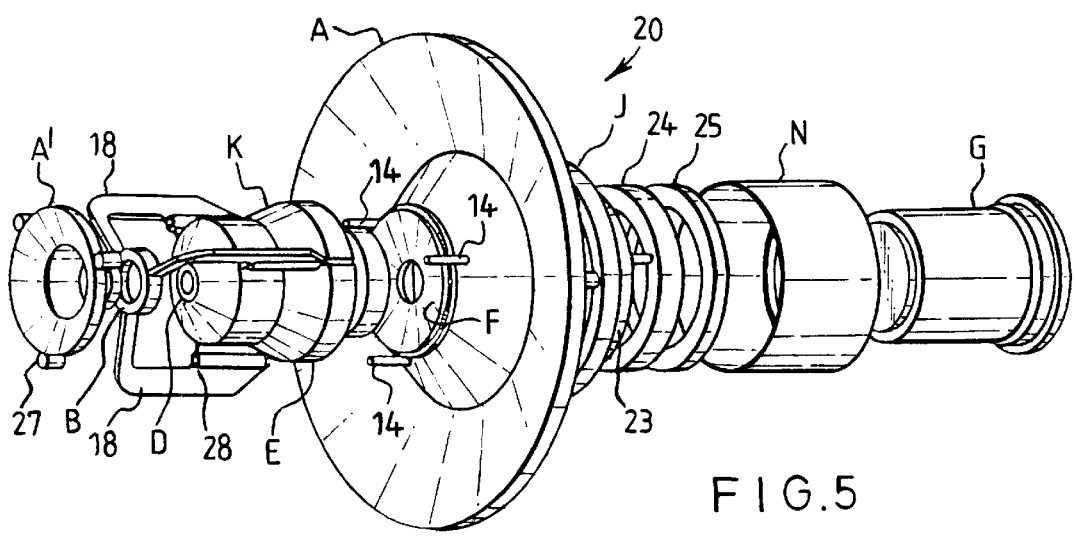
FIG. 5 is an exploded view of FIG. 3.

FIG. 5 illustrates the optical system 20 in exploded form to enable the components to be visualised more clearly. In particular the linear actuator 15 is shown as being formed by an annular permanent magnet 24 to which the ends of rods 14 are secured, and two annular electromagnets 23,25. The permanent magnet 24 is movable axially and is located between the electromagnets 23,25 which are fixed relative to the housing J which is made of aluminium and which is provided with a cylindrical liner N which functions as a solenoid housing. The liner N may be made of PTFE to facilitate movement of magnet 24, the inner diameter of which is sized to provide a clearance from the outer surface of housing G.

Field of view change requires a linear movement of the wide angle mirror $A^1$ along the optical axis 21 by approximately 9 mm achieved by the rod and linear actuator arrangement. The arrangement enables the wide angle mirror $A^1$ to be driven evenly by means of three equi-spaced rods 14 thus minimising the potential for jamming. The arrangement of rods 14 utilizes the webs providing support to the telescope secondary mirror $A^1$ thus minimizing optical obscuration. In the narrow-angle mode (FIG. 1) the mirror $A^1$ operates as a baffle only and hence is not required to be positioned accurately. This coincides with maximum rod extension and overhang. In the wide-angle mode (FIG. 2) the mirror $A^1$ is required to operate as a mirror and is required to be located accurately. This coincides with minimum rod extension and overhang, but additionally the junction of each of the rods 14 with the mirror $A^1$ is enlarged to form a stop 27 which seats against the shoulder 28 formed on the web 18 at the opening of passageway 17. Thus the three such stops 27 provide accurate location of mirror $A^1$. The rods are attached to the central moving annular magnet 24 and the use of rare earth magnets will enable the mechanism to be locked at the extremes of movement with power off This approach combined with return springs will enable a fail-safe preferred power off position to be provided.

What is claimed is:

1. An optical system comprising an objective which forms an intermediate image and a relay which transfers radiation from the intermediate image to a focal plane, wherein the objective comprises a principal concave primary mirror and a secondary mirror arranged generally in the form of a Cassegrain system and the optical system is rendered dual field by the provision of an alternative primary mirror which is axially movable between an out-of-use position adjacent the secondary mirror and an in-use position adjacent the intermediate image, where the principal concave primary mirror forms part of a housing for a linear actuator which is connected by co-axial rods to the alternative primary mirror.

2. An optical system as claimed in claim 1, wherein the system is designed to handle infrared waveband radiation and the focal plane is formed on a surface of a detector system within a housing, the housing being coaxially disposed within the linear actuator housing.

3. An optical system as claimed in claim 2, wherein the linear actuator comprises an annular chamber housing an axially movable ring to which the rods are attached.

4. An optical system as claimed in claim 3 wherein the linear actuator is electromagnetically operated and the ring is a rare earth permanent magnet, which enables the actuator to be locked at the extremes of movement with power off.

* * * * *